Dec. 20, 1932.    W. V. CORNETT    1,891,221
PAVEMENT BREAKING MACHINE
Filed March 18, 1930    2 Sheets-Sheet 1

INVENTOR.
Walter Vance Cornett

BY
ATTORNEY.

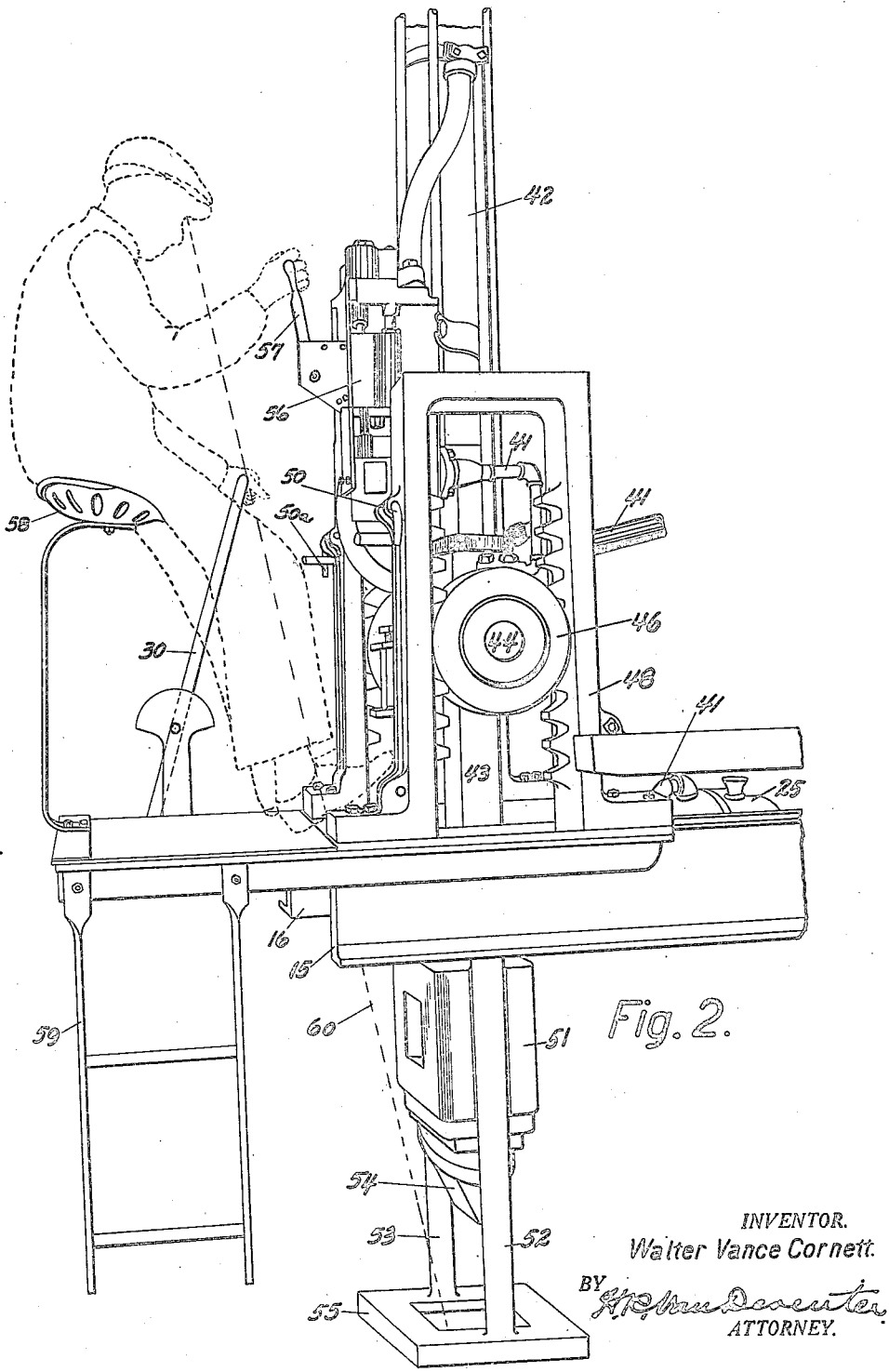

Patented Dec. 20, 1932

1,891,221

UNITED STATES PATENT OFFICE

WALTER VANCE CORNETT, OF BROOKLYN, NEW YORK, ASSIGNOR TO RAPID PAVEMENT BREAKER CORPORATION, A CORPORATION OF NEVADA

PAVEMENT BREAKING MACHINE

Application filed March 18, 1930. Serial No. 436,661.

This invention relates to a machine for breaking concrete pavements and the like, and has for its object improvement in the machine shown, described and claimed in the pending application for United States Letters Patent, Serial Number 166,366, filed February 27th, 1927. Further objects of the invention are:

The provision of mechanical means for moving the turn-table or movable frame carrying the hammer or impact tool; an improved construction for the control mechanism for the hammer; an improved guide for the hammer; means for quickly changing the bits or tools used with the hammer.

Other objects will be apparent from the following description and drawing showing by way of illustration one embodiment of the invention.

In the drawings:

Figure 2 is a side view of the hammer or impact tool and part of the truck, Figure 1.

Figure 1:
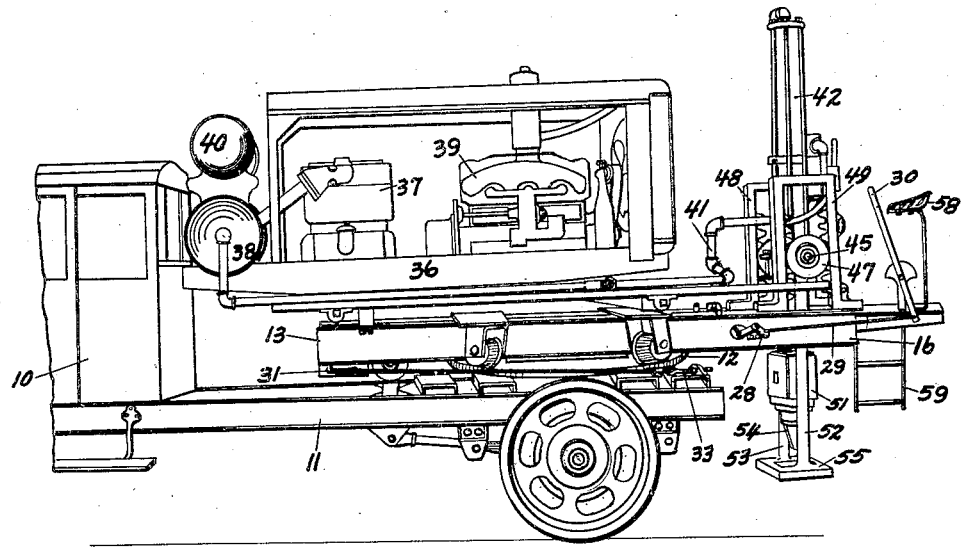
Figure 1 is a side view of a pavement breaking machine embodying the invention.

The pavement breaking machine as a whole is shown in Figure 1, and comprises a suitable vehicle upon which all the mechanism is mounted so as to be readily transportable. Any desired type of vehicle may be used but a self-propelled vehicle such as an ordinary automobile truck is preferable. The term "self-propelled" is herein used to denote a vehicle having a complete power plant such as the usual gasoline engine, as distinguished from a vehicle having an electric motor requiring power from an outside source.

The numeral 10 therefore denotes an automobile truck of any description (the front part is not shown in detail) and having the usual chassis framework 11. Suitably secured to the cross members of this framework is a track 12, upon which is mounted the turn-table or movable support 13 adapted to revolve around the center pivot or bearing 14 secured in the framework 11. The details of construction and mounting of this turn-table are fully described in the pending application Serial No. 166,366 hereinbefore mentioned.

The turn-table 13 may consist of the side members 15, 16 and the cross members 17, 18. The side members project rearwardly of the truck and beyond the frame 11 thereof as shown in Figure 1.

Secured to the underside of the turn-table is a drum 19 carrying a gear 20 which is engaged by a worm 21 supported in bearings 22, 23 in the cross members and secured to the shaft 24 of a suitable fluid engine, such as an air motor 25 mounted on the side members 15, 16 and therefore movable with the turn-table. This motor constitutes a source of power for moving the turn-table and is controlled by a valve 26, connected via rod 27, crank 28 and rod 29 to the hand lever 30.

Figure 3:
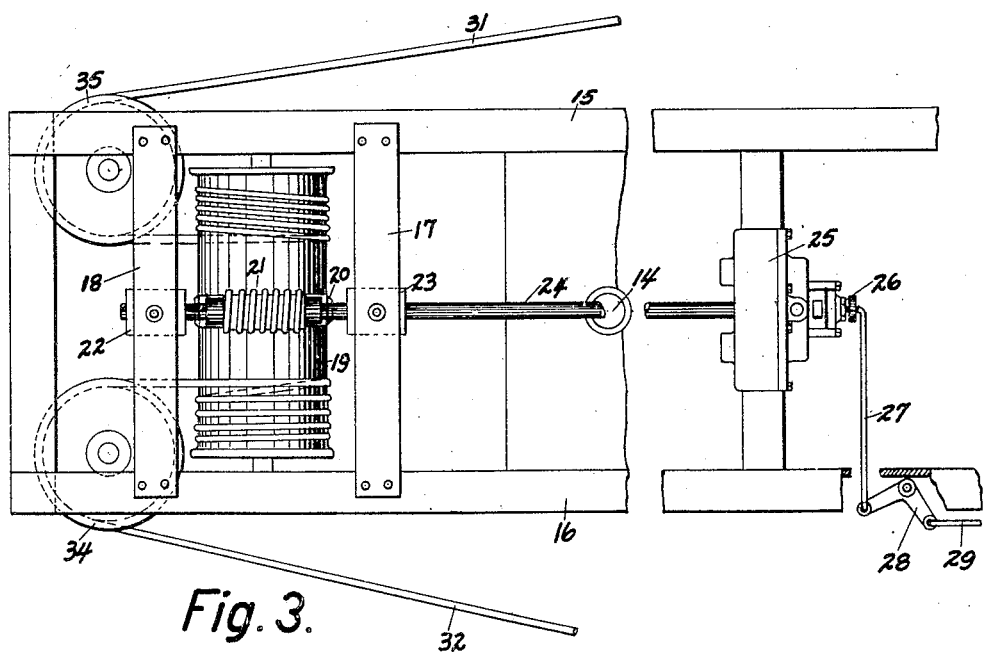
Figure 3 is a view looking upwards, of the bottom of the turn-table removed from the truck to show the mechanism for turning the table.

Cables 31, 32 have their outer ends connected to the side members 15, 16, one of these connections being shown at 33, Figure 1. These cables pass over pulleys 34, 35 supported on the turn-table, and their inner ends are wrapped about drum 19 in opposite directions as shown in Figure 3. Obviously 31, 32 can be one continuous length of cable, if properly wrapped on drum 19 as shown.

Upon the turn-table 13 so as to be freely movable therewith is a framework 36 secured to the table in any suitable manner and upon this frame are mounted a suitable air compressor 37, a storage tank 38 for the air, an internal combustion engine 39 connected to and driving the compressor, a fuel tank 40 for the engine, and such auxiliary equipment as water tank, radiator and other accessories necessary to make the outfit complete. The storage tank 38 is connected by piping 41 to the motor 25 and the impact tool or hammer.

The hammer may be of any suitable type. A suitable hammer is described in detail in the application hereinbefore mentioned and in application Serial Number 258,784, filed March 3rd, 1928.

The hammer is mounted on the rear end of the turn-table platform so that when the table is moved, the hammer will move in an arc about the rear end of the truck. The cylinder 42 is carried by a mounting 43 including stub shafts on each side at 44, 45. These stub shafts are mounted in pinions 46, 47 which act as track engaging rollers engaging the tracks 48, 49. These tracks have hinged portions adapted to be disengaged by means of handles 50, 50ª, to permit the pinions 46, 47 to be vertically adjusted in the tracks thereby varying the stroke of the hammer. This adjusting mechanism is described in detail in application Serial No. 258,784 heretofore mentioned.

The tracks 48, 49 are permanently secured to the turn-table. The hammer is vertically adjustable in the tracks. In addition the hammer may be moved around the stub shafts 44, 45 as a center and is therefore angularly adjustable in relation to the turn-table.

Within cylinder 42 is a reciprocating piston (not shown) and connected to the piston rod thereof, is the head 51 running in the downwardly depending guides 52, 53. This head is adapted to receive various types of tools, one of which is shown at 54. The guides 52, 53 are joined at the bottom by the apertured plate 55.

Mounted upon and movable with the hammer is the control valve 56 having the lever 57. By the manipulation of this lever, air is admitted to either side of the piston in cylinder 42 and the piston caused to reciprocate and thereby cause the tool 54 to strike a blow upon the work positioned below plate 55.

At the extreme rear end of the platform a seat 58 is provided for the operator who can, from said seat easily reach and operate the control valve 56, the lever 30 controlling the movement of the turn-table and the handles 50, 50ª for vertically adjusting the hammer. The operator can also tip the hammer forward or backward in the bearings formed by stub shafts 44, 45.

A ladder 59 is secured to the turn-table and movable therewith to enable the operator to easily reach the seat.

In operation, the truck is controlled in the usual manner by a driver in the cab thereof, who has nothing to do with the operation of the hammer per se except to move the truck in accordance with the instructions of the hammer operator.

The hammer operator being seated on seat 58 as shown in dotted lines Figure 2, by means of lever 30 under the control of his left hand brings the hammer into the desired position by causing motor 25 to operate drum 19 and, by means of cable 31, 32 revolve the turn-table 13 carrying the hammer to the proper position. The operator then manipulates handle 57 thereby actuating the hammer and causing it to strike a blow. One or more blows can be struck without moving the turn-table and the hammer may be tilted to change the point of impact. By moving the turn-table, a series of blows can be struck on an arc having a radius of 10 feet or more.

The frame between the operator's feet being open, he can see along the dotted line 60 just where the hammer will strike. As he shifts with the hammer, it is not necessary for him to move to see where the next blow will strike.

The compressor, air storage tank, fuel tank, radiator, engine, air hammer and all other parts movable with the turn-table 13 are so disposed in relation to the center bearing or pivot 14 that the turn-table is approximately in balance regardless of its position relative to the truck. This not only insures that a minimum of power is necessary to move the turn-table without binding or undue wear on the supporting rollers on one side or the other, but it gives the operator a more delicate control of the turn-table so that he can very quickly move it in order to bring the plate 55 directly over the spot where the tool 54 should strike. As the whole hammer carrying the tool 54 may be tipped angularly the tool can be made to strike on a line parallel to the direction in which the truck is moving without operating the turn-table, and by operating the turn-table (leaving the hammer in a substantially vertical position) a relatively wide path may be cut as the truck moves slowly forward.

By having the turn-table and other parts in balance, the operator is enabled to cushion the strokes of the hammer by proper manipulation of lever 57 thereby relieving the entire machine from excessive vibration and the springs of the truck from severe flexing. The degree of cushioning effect that can be obtained by means of a proper manipulation of the air in the hammer above and below the piston thereof, is affected by the nicety of balance obtained with the turn-table regardless of what position it may be in relative to the truck.

It will be seen from the foregoing that the pavement breaking machine can be readily operated without any undue fatigue. The work the operator is required to do is limited to the operation of the control valves and does not require any great exertion. The hammer and its complete power plant are controlled by one man and all necessary working adjustments can be made by the operator without leaving his seat.

I claim:—

1. A pavement breaking machine comprising a vehicle, a movable support thereon, an impact tool mounted upon one end of said support, means on said support for securing said tool rigidly thereto during operation, and a source of power mounted on the other end of said support for balancing said impact tool and for moving said support.

2. A pavement breaking machine comprising a vehicle, a turntable thereon, an impact tool mounted upon one side of said turntable, means on said turntable for securing said tool rigidly thereto during operation, and a source of power mounted on the opposite side of said turntable for balancing said impact tool and for moving said turntable.

3. A pavement breaking machine comprising a vehicle, a movable support thereon forming a platform extending beyond the frame of said vehicle, an impact tool located on one side of said platform, means on said platform for securing said tool rigidly thereto during operation, and a source of power mounted on the opposite side of said support for balancing the impact tool and for moving said support.

4. A pavement breaking machine comprising a vehicle, having a rearwardly extending frame, a movable support including a platform carried on said frame and extending rearwardly thereof, an engine on said support adapted to move the same, an impact tool mounted on said platform and projecting through the platform, and means for adjustably and rigidly securing said tool thereto.

5. A pavement breaking machine comprising a vehicle, a movable support thereon and including a platform, an impact tool on said platform, an engine on the support having a driving shaft, a drum on said support, gearing between said shaft and drum, and a cable wound about said drum and having one end connected to said vehicle whereby said support may be moved by the rotation of said drum.

6. A pavement breaking machine comprising a vehicle, a turntable thereon including a platform and a motor for turning the table, manually operated control means on said platform for controlling the operations of the turntable, an impact tool mounted near the peripheral edge of said turntable and projecting therethrough, and adjustable means including said motor for balancing said impact tool.

7. A pavement breaking machine comprising a vehicle, a power operated turntable thereon including a platform, an impact tool carried at one side of said turntable and projecting beneath the same, means on said platform for securing said tool rigidly thereto during operation, a seat on said platform, and a lever adjacent said seat for controlling the movement of said turntable whereby the operator may observe the operation of the tool while operating the turntable.

8. A pavement breaking machine comprising a vehicle, a power operated turntable thereon including a platform portion, a seat on said platform portion, an impact tool having portions above and below said platform, a lever adjacent said seat for controlling the movement of said turntable, and an opening in said platform whereby an operator on said seat may observe the operation of the impact tool below the platform while operating said lever without moving from the seat.

9. In a pavement breaking machine, a rotatable platform, an impact tool carried thereon and having its work engaging portion extending through and below the same, means on said platform for securing said tool rigidly thereto during operation, power means carried by said platform for moving the same relative to the work to be done, and means independent of said power means for adjusting the weight of the power means on the platform so as to balance the operative force of the impact tool.

10. In a pavement breaking machine in combination with a freely movable vehicle, a movable counterbalanced platform adapted to carry an operator, means whereby the operator may control said platform carried thereon, an engine connected to said control means and movable with said platform, an impact tool mounted on said platform, means on said platform for securing said tool rigidly thereto during operation, means for operating said tool movable with said platform, and control means for said tool adapted for actuation by the same operator who controls said movable platform.

11. In combination, a self-propelled vehicle having a motor, a pneumatically operated impact tool mounted on said vehicle but adapted to be moved thereon to various positions, means associated with the impact tool for counterbalancing the impact force of the tool, pneumatically operated means for moving said tool as aforesaid, means for securing said tool rigidly in various positions, and means whereby a single operator may control the operation of said tool and the movement thereof on said vehicle.

12. In combination, a self-propelled vehicle having a motor, a power actuated impact tool mounted thereon and adapted to be mechanically moved to various operative positions, means for securing said tool rigidly in various positions, means associated with the impact tool for counterbalancing the impact force of the tool, a source of energy carried by said vehicle for actuating said tool and moving the same to various operative positions on said vehicle, and means whereby the actuation of said tool and the movement thereof may be controlled by a single operator.

13. In combination with a vehicle having a propelling motor, a turntable having a portion projecting rearwardly of the vehicle, said portion forming a platform, a pavement breaking tool mounted on said platform and rigidly secured thereto during operation, means independent of said motor for moving said platform whereby said tool may be brought into various positions in relation to said vehicle, means for vertically adjusting said tool on said platform, and motor means mounted on said platform and movable therewith, for swinging said tool on a horizontal axis and counterbalancing the impact force of the pavement breaking tool.

14. In combination a vehicle having a propelling motor, a movable platform thereon, a motor for moving the platform, an air hammer having a vertical cylinder mounted on said platform so that it may be vertically adjusted thereon, means permitting the cylinder to be angularly adjusted in relation to the platform, and means for counterbalancing the force of the hammer in the various adjusted positions.

15. In combination a vehicle having a propelling motor, a movable platform thereon, a motor for moving the platform, a horizontally and vertically adjustable air hammer carried by said platform, means for counterbalancing the hammer in the various adjusted positions, and a valve for controlling the operation of said air hammer mounted thereon, movable therewith, and adapted to be operated from said platform.

16. In combination with a vehicle having a propelling motor, a movable platform balanced about an axis within the base of the vehicle, said platform carrying a pavement breaking apparatus mounted thereon, a motor for moving said platform about said axis, and means for maintaining the balance of said platform during operation of the pavement breaking apparatus.

17. In combination with a vehicle having a propelling motor, a substantially balanced turntable thereon, a pavement breaking device mounted upon said table, motor means for moving the table about an axis, means for adjusting said device horizontally and vertically on said table without affecting the balance thereof, and means for maintaining the balance under all operating conditions of the pavement breaking apparatus.

In testimony whereof I affix my signature.

WALTER VANCE CORNETT.